(12) United States Patent
Adriani

(10) Patent No.: US 8,975,801 B2
(45) Date of Patent: Mar. 10, 2015

(54) THERMIONIC SOLAR CONVERTER

(75) Inventor: Massimo Adriani, Rome (IT)

(73) Assignee: Consiglio Nazionale Delle Richerche, Rome, RM (IT)

( * ) Notice: Subject to any disclaimer, the term of this patent is extended or adjusted under 35 U.S.C. 154(b) by 16 days.

(21) Appl. No.: 13/985,226

(22) PCT Filed: Feb. 24, 2012

(86) PCT No.: PCT/IT2012/000056
§ 371 (c)(1),
(2), (4) Date: Aug. 13, 2013

(87) PCT Pub. No.: WO2012/114366
PCT Pub. Date: Aug. 30, 2012

(65) Prior Publication Data
US 2013/0333749 A1    Dec. 19, 2013

(30) Foreign Application Priority Data

Feb. 25, 2011    (IT) .............................. RM2011A0088

(51) Int. Cl.
*H01J 45/00*    (2006.01)
*H01L 31/04*    (2014.01)
*F24J 2/05*    (2006.01)

(52) U.S. Cl.
CPC ............. *H01L 31/0406* (2013.01); *H01J 45/00* (2013.01); *F24J 2/055* (2013.01)
USPC ........... 310/300; 136/251; 136/252; 136/253; 136/246

(58) Field of Classification Search
CPC ...... F03G 6/001; H01J 45/00; H01L 31/0406; H02N 11/006
USPC ................... 310/300; 136/246, 253, 251, 252
See application file for complete search history.

(56) References Cited

U.S. PATENT DOCUMENTS 3,331,707 A * 7/1967 Werth ............................ 136/253
3,406,288 A * 10/1968 Bois, Jr. et al. ........ 250/214 DC (Continued)

FOREIGN PATENT DOCUMENTS

FR    2 876 232 A1    4/2006

OTHER PUBLICATIONS

International Search Report for PCT/IT2012/000056, mailed Jul. 30, 2012 (in English).

(Continued)

*Primary Examiner* — Terrance Kenerly
(74) *Attorney, Agent, or Firm* — Smith, Gambrell & Russell, LLP

(57) ABSTRACT

Thermionic solar converter with a linear arrangement of the components, suitable for the direct conversion of solar energy into electrical energy and the combined generation of heat and energy, in the form of an elongated transparent vacuum tube comprising: a cathode (5) and at least one anode (6), said cathode and anode being arranged longitudinally alongside each other along the tube: grid electrodes (10, 11, 13, 14, 15, 16) for generating electric fields; means (18) for directly cooling the at least one anode; means (7) for electrically connecting the electrodes from the inside to the outside; an optical access window (4) along the surface area of the tube; wherein: the cathode is made of conductive refractory material, is suspended centrally inside the tube with an elongated form and forms the element for capturing the solar energy, on which the sunlight is directly focused in order to perform the thermionic conversion, without any intermediate heat transfer means; the electrical connection means form a longer path and have a form which is able to compensate for the heat expansion; the cathode and the at least one anode have a relative arrangement with a view factor of between 0.001 and 0.5, more preferably between 0.001 and 0.3, more preferably between 0.001 and 0.1, more preferably between 0.001 and 0.05, even more preferably between 0.001 and 0.03; said converter comprising further a radiation shield (9) which is positioned along the inner surface of the tube.

23 Claims, 3 Drawing Sheets

(56) References Cited

U.S. PATENT DOCUMENTS

| | | | |
|---|---|---|---|
| 3,433,676 A * | 3/1969 | Stein | 136/253 |
| 3,713,668 A * | 1/1973 | Flindt | 280/762 |
| 4,257,823 A | 3/1981 | Bevilacqua et al. | |
| 4,266,179 A | 5/1981 | Hamm, Jr. | |
| 2002/0157701 A1 * | 10/2002 | Akamatsu | 136/246 |
| 2003/0111104 A1 | 6/2003 | Akamatsu | |
| 2013/0319501 A1 * | 12/2013 | Hilliard | 136/246 |

OTHER PUBLICATIONS

Written Opinion of the International Searching Authority for PCT/IT2012/000056, mailed Jul. 30, 2012 (in English).

Anonymous; "View factor"; Wikipedia; as retrieved from the Internet at URL:http://en.wikipedia.org/w/index.php?title=View_factor&oldid=399399072&printable=Yes, on Jul. 19, 2012; whole document.

John R Howell; "Radiation Configuration Factors C-63"; A Catalog of Radiation Heat Transfer Configuration Factors; as retrieved from the internet at URL:http://www.engr.uky.edu/rtl/Catalog/sectionc/C-63.html, on Jul. 19, 2012; whole document.

Martin R. Martinez; "Cylindrical Inverted Multi-Cell (CIM) Thermionic Converter for Solar Power and Propulsion Systems"; AIP Conference Proceedings, vol. 746; Jan. 1, 2005; pp. 926-934.

International Search Report for PCT/IT2012/000056 mailed Jul. 30, 2012 (in English).

* cited by examiner

THERMIONIC SOLAR CONVERTER

FIELD OF THE INVENTION

The invention relates to a device for collecting solar energy and converting it from radiating form into electrical and thermal energy.

The object of the invention is to obtain a high conversion efficiency and simple implementation in systems for concentrating the solar energy arranged in linear arrays.

PRIOR ART

The present-day thermionic conversion systems consist mainly of three types: close-spaced converters; electric-field converters; caesium vapour converters.

All these types of converter operate reducing as far as possible, from 0.3 mm to a few microns, the distance between the electrodes and using an electric field in order to lower the working function of the cathode and/or the ionized caesium vapours, so as to reduce the spatial charge between the electrodes.

For conversion purposes a thermodynamic cycle is used where the thermal energy converted into the kinetics energy of the electrons is extracted from them by means of the inverse electric field, slowing them until they strike the anode, where the residual kinetic energy is dissipated by the cooling system.

The types of converters described above have a main defect: most of the energy used to heat the cathode, at the temperature for thermionic emission of the materials, passes directly from the cathode to the anode by means of radiation and is dissipated by the cooling system owing to the directly facing and close arrangement of the surfaces of the two electrodes.

Since this energy is not transported by the electrons, it is energy which is lost by the system and this drastically reduces the conversion efficiency.

Two strategies are principally employed in these devices in order to overcome this problem:

1) Reducing the thermionic emission temperature by choosing materials with a lower working function and reducing the distance between cathode and anode (capturing electrodes with a smaller kinetic energy);

2) Reducing the working function of the cathode by means of application of an electric extraction field via a photolithographic process carried out on the surface and deposition of an extraction grid at a distance of a few microns from the emitting surfaces. The applied electric field reduces the working function of the cathode, allowing thermionic emission also at room temperature.

Both methods increase the conversion efficiency of the respective devices, reducing the irradiating emission of the cathode and therefore the energy losses, but, on the other hand, drastically reduce the thermodynamic efficiency which is defined by the temperature difference between anode and cathode; the product of the two efficiencies gives the total efficiency of the device.

SUMMARY OF THE INVENTION

The scope of the present invention is to exploit in an economically advantageous manner the solar energy obtained from direct radiation in concentration plants for the production of electric energy, by increasing the power converted per unit of exposed surface area by means of an increase in the electric conversion efficiency.

In order to achieve this result, a high-temperature thermionic converter is designed having increased efficiency, which allows:

1) to reduce the energy lost through radiation by using a more efficient insulation system, which is formed by means of vacuum radiation shields so as to reflect most of the energy irradiated by the cathode, back onto the same cathode;

2) to reduce the energy exchanged between cathode and anode by direct radiation by means of the relative positioning of the surfaces, aligning them in the same plane in such a way that, not directly facing each other, they are able to exchange energy on a very small scale;

3) to optimize the electrical connection of the cathode by means of elongation of the output path so as to limit the losses through thermal conduction via the electrical conductors and lower the output temperature of the terminals.

These measures enable the emitter cathode to operate at its maximum permissible temperature, which may vary for example between 2300° C. and 3100° C. for tungsten, carbon, tantalum or rhenium cathodes, but which may also have a different temperature range in the case of cathodes made of other materials, thereby drastically reducing the system losses due to radiation and increasing the thermodynamic efficiency and therefore the total efficiency.

The device according to the invention is a thermionic solar converter with a linear arrangement of the components, suitable for the direct conversion of solar energy into electrical energy and at the same time suitable for the combined generation of heat and energy, in the form of an elongated vacuum tube made of glass or other heat-stable transparent material, with a cathode and at least one anode arranged longitudinally and mounted in the centre of the tube, with grid electrodes for the generation of electric fields with means for direct cooling of the at least one anode and means for electrically connecting the electrodes from the inside to the outside, wherein said converter is designed to operate at the maximum sustainable temperature of the cathode and wherein the conduction heat transfer is limited by means of an elongated connection path with electrical connectors, wherein both the faces of the cathode and of the at least one anode are used as surfaces for the emission and the absorption of the electrons. Said converter further comprising an optical access window along the surface area of the tube, which is an optical element of the concentration system (which may be in the form of a cylindrical lens or other types of lenses or concentration prisms achievable by varying the shape of the tube wall) allowing the use of systems for linear concentration of the solar energy such as cylindrical/parabolic mirrors; wherein the cathode is made of a conductive refractory material, and is suspended inside the tube with an elongated shape so as to constitute the element for capturing the solar energy, onto which the sunlight is directly focused in order to perform thermionic conversion, without any intermediate means for transfer of the heat, and wherein the electrical connections with the outside form an elongated path so as to limit the losses due to thermal conduction and have a form able to compensate for the heat expansion. Also present in the tube are one or more deflection magnets for generating a magnetic field; radiation shields able to limit the radiation heat exchange with the outside; moreover the radiation heat exchange between the cathode and the anodes is limited by the relative positions of these electrodes which face each other with their respective profiles so as to produce a view factor or coefficient which varies preferably between 0.001 and 0.5, more preferably between 0.001 and 0.3, more preferably between 0.001 and 0.1, more preferably between 0.001 and 0.05, and even more preferably between 0.001 and 0.03.

The converter has an access opening for the anode cooling pipes passing through flexible diaphragms at the two opposite ends and electrical wires for connection to both sides, so as to allow easy installation of a plurality of units aligned in rows by means of hydraulic and electrical connections; it also comprises longitudinally flattened pipes mounted on the sides of the cathode with the triple function of: acting as electrodes for connection with the outside, forming the anode conversion surface with a low view coefficient between the cathode and the anodes, and cooling these anodes so as to operate at a temperature which is as low as possible (80-100° C.) while ensuring efficient cooling, allowing at the same time recovery of heat for low-temperature uses.

The converter tube comprises radiation shields along the inner surface, except for the optical access opening referred to below as "access window", in order to minimize the radiation losses.

The converter further comprises mechanical locking means at the two ends of the tube for exact alignment of the elements and for positioning the converter with respect to the optical concentration system.

The converter can be used in combination with an optical system of energy concentration that is internal or external to the tube.

KEY FOR FIGURES

1 Series of row-mounted converters;
2 Cylindrical/parabolic mirrors with 40° opening;
3 Vacuum tube;
4 Access window;
5 Linear cathode heated by means of irradiation;
6 Cooled anodes;
7 Double spiral for reducing conduction losses of cathode;
8 Series of permanent deflection magnets;
9 Reflective radiation shields;
10 Auxiliary containment grids;
11 Deflection grids;
12 Locking and centring reliefs;
13 Control grids;
14 Acceleration and deflection grids;
15 Deflection grids;
16 Anode field shielding grids;
17 Holes for receiving the cooling pipes;
18 Anode cooling pipes;
19 Evacuation pipe;
20 Main hole for receiving cathode terminals;
21 Electrical connection base;
22 Elastic diaphragm for receiving the anode cooling pipe;
23 Elastic diaphragm for receiving the end of the cathode, for compensation of heat expansion and glass/metal connection.
A Cross-Sectional Axis for View Shown in FIG. 3.

The dimensions, proportions, number of grids, optical element of the access window and materials may vary, depending on the particular functional relationships described below.

The drawings shown are not constructional drawings, but contain sufficient information to allow the preparation of constructional drawings; they are to be regarded as being purely exemplary and intended to illustrate the text, but do not limit the scope of the invention.

DETAILED DESCRIPTION OF THE INVENTION

Figure 1:
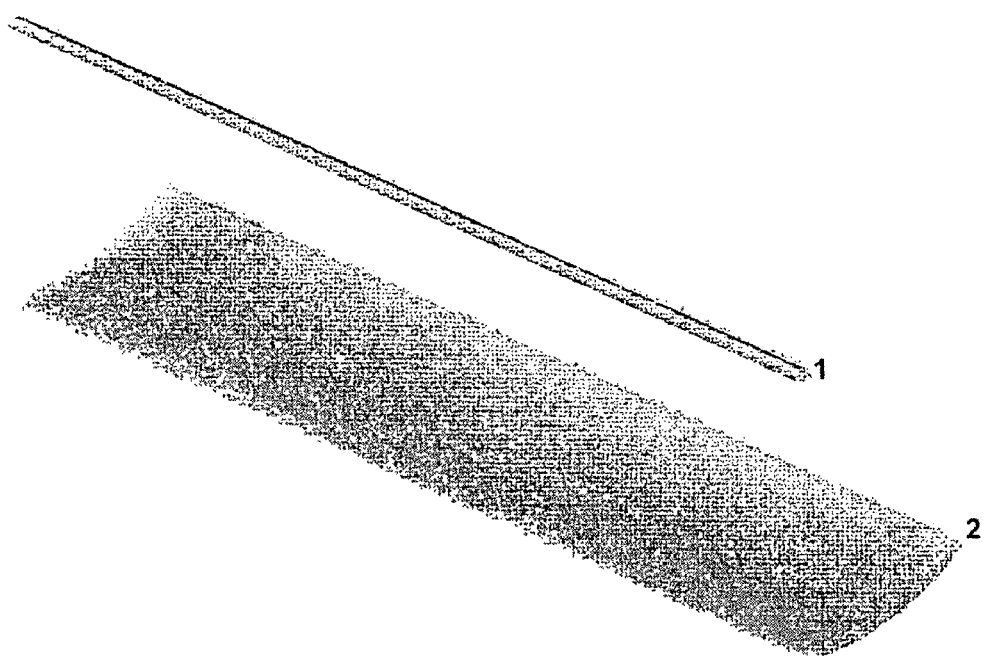
FIG. 1: Shows an overall axonometric perspective view. An example of positioning of a number of units of the thermionic solar converter arranged along the focal line of a row of cylindrical/parabolic mirrors is shown.
Figure 2:
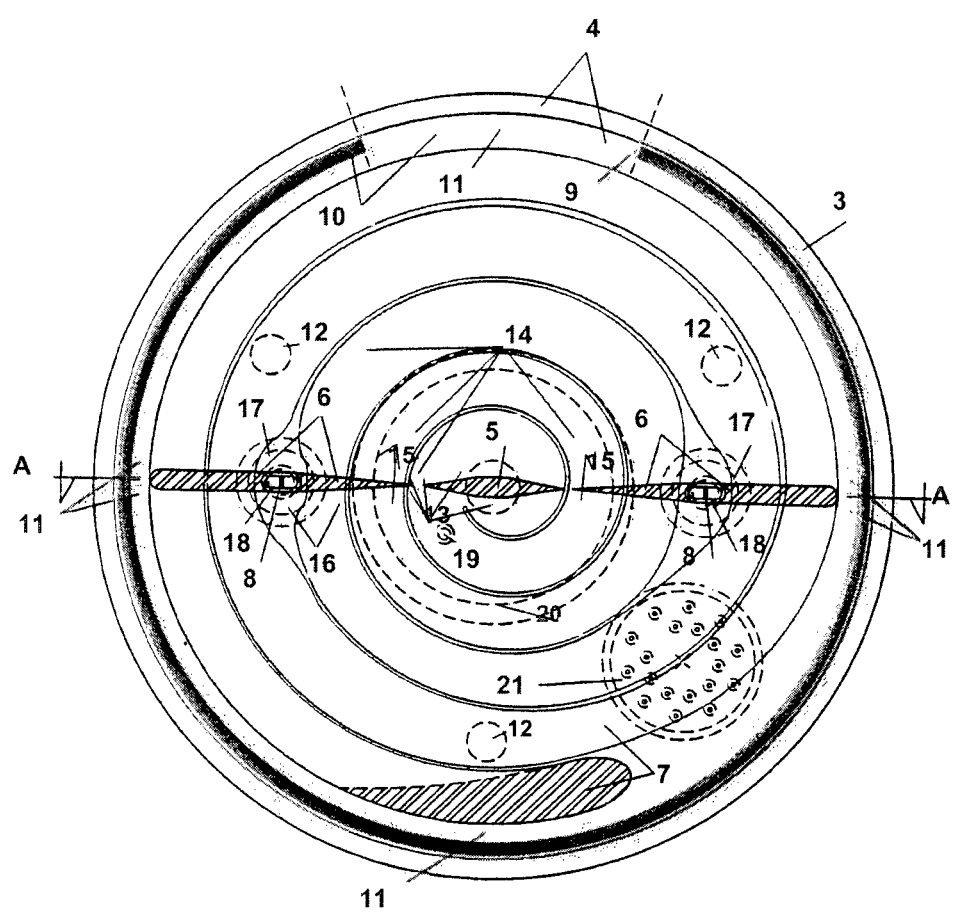
FIG. 2: Shows a cross-section through the thermionic solar converter. A cross-section through the thermionic solar converter is shown, with the functional parts indicated.
Figure 3:
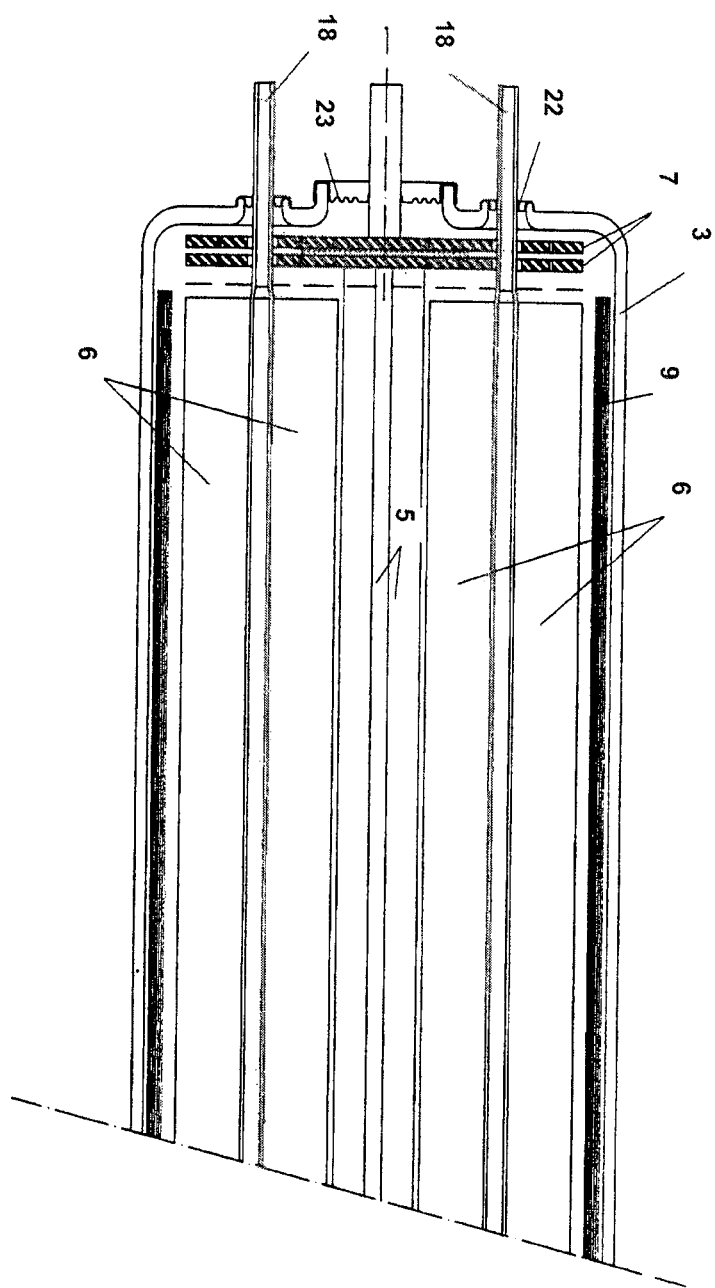
FIG. 3: Shows a longitudinal section along the axis (A) of the thermionic solar converter shown in FIG. 2.

In this description reference is made to FIGS. 1, 2 and 3, citing the "view factor" which, between a first and second body, is defined as being the fraction of radiating energy which leaves the first body and reaches the second body. On the basis of this definition the view factor is a non-dimensional parameter which is variable between 0 and 1. There exist tables, known to the person skilled in the art, for calculating the view factors in various configurations.

The present linear thermionic solar converter as claimed in Claim 1 comprises an elongated high-vacuum tube which is made of heat-stable transparent material, for example glass with a radiation transmission which is as broad as possible and stabilized by means of annealing. The tube advantageously has an elongated cylindrical form (3) with dimensions, i.e. diameter 200 mm and length 1000 mm, which are indicated only by way of example.

Along one segment of the cylinder surface, the tube has an optical access window, advantageously with an elongated rectangular form (4), parallel to the longitudinal axis, made of the same transparent material as the tube, covering a segment preferably of 40° which forms, with the shape of the wall, an optical element forming an integral part of the system for focusing the solar energy on the cathode (5) and which allows the use of linear solar energy concentration systems for example of the type consisting of cylindrical/parabolic mirrors (2), multiple or prismatic mirrors, single or multiple lenses, Fresnel or prismatic lenses, or any other concentration system which is typically positioned outside the tube, but advantageously also inside in the case of miniaturized converters. This window may be shaped in the form of a lens (not shown) or other optical element and may be surface-treated internally or externally, for example by means of deposition of conductive, anti-reflection, selective transmission, insulating, hydrophobic, self-cleaning, protective or self-regenerating layers, and/or any other type of functional treatment of the surface or surfaces known per se.

Each of the two ends or bases of the tube or cylinder has a number of flanged holes (17; 20) for mounting resilient diaphragms for receiving a cathode or at least one anode and a number of external reliefs or cavities for exact alignment of the parts and positioning of the converter with respect to the optical concentration system and the mechanical locking means (12). These holes (17; 20) are advantageously fitted with flexible sheet-metal diaphragms (22; 23) having a low expansion factor, and concentric undulations for offsetting heat expansion of the ends of the cathode and of the cooling pipes, connected to the glass so as to maintain the vacuum. The holes for receiving the cathode, the evacuation pipe (19) and the pipes for cooling the anodes (8; 5) welded thereto are formed in these diaphragms. According to an alternative embodiment which is equally effective, the cathode may extend from only one of the two ends of the vacuum tube and be kept in the central position by means of elastic ties, in case of miniaturization of the device.

NB: the measurements are not indicated since they may be varied depending on the requirements, the different models and the plant characteristics.

The following are housed longitudinally inside this tube:

1) a cathode (5) made of conductive refractory material (such as tungsten or graphite), with an essentially elongated linear form, such as a flat rectangular bar with tapered edges, or in the form of a stretched or spirally wound filament, strip, lamina or bar with any shape and cross-section, including rectangular or prismatic, polygonal, lenticular or droplet cross-section, which is preferably flattened in order to reduce its thickness, which may use both the opposite sides as active electron-emitting surfaces, in order to perform the thermionic conversion cycle, or with a cylindrical or conical shape, a circular, oval or elliptical cross-section, which extends along the entire length of the vacuum tube, in a direction parallel to the axis of the tube, positioned longitudinally at the centre and suspended from one or both the ends along an elongated path for connection to the electrical output terminals, arranged in any way inside the vacuum tube, such as straight, folded, interwoven or wound paths, arranged with one side facing the inlet window which is heated to a high temperature by means of radiation directly by the concentrated light of the sun without intermediate means for transmission of the heat, and passing out, via the suspended elements, from one or both the sides of the vacuum tube, so as to allow assembly of several models in a row by means of external electrical connections;

2) at least one anode (6), preferably two anodes extending linearly, advantageously in the form of pipes or ducts or suitable for housing metal cooling pipes or ducts (18) of any shape or cross-section, which may, advantageously but not exclusively, have a cylindrical, polygonal, lenticular, trapezoidal, droplet, oval, elliptical or circular cross-section, being preferably flattened longitudinally so as to reduce their thickness and finned laterally, being arranged laterally and edgewise with respect to the cathode in a minimum radiation position, passing out from the two ends of the vacuum tube for the hydraulic and electrical connections, via elastic diaphragms, to which they are sealingly welded and which keep them positioned laterally edgewise with respect to the cathode, and which may advantageously be finned so as to obtain substantially two sides which are generally flat for each anode, being suspended along the two sides of the cathode (5) as active surfaces for collecting the electrons. The at least one anode, preferably the two anodes, are advantageously provided with cooling means (18) or perform at the same time the function of cooling means for achieving the thermionic conversion cycle with the triple function of being electrodes for connection to the exterior, forming or supporting the surfaces of the conversion anodes with a low view coefficient between cathode and anodes (5; 6; 18), and of being means for performing cooling by means of circulation of a fluid, so as to cause the anodes to operate at the lowest possible temperature, for example about 80-100° C., optionally but not exclusively, the temperature being included in the liquid phase range of water or some other heat-carrier fluid, for example between 10° C. and 100° C. depending on and in keeping with the temperature available for the function of cooling the anode or anodes, allowing at the same time recovery of the discarded heat for low-temperature uses such as the heating of water for sanitary use.

3) optionally a permanent magnet (8), but also more than one magnet, for deflection, of any shape, which is/are positioned inside or outside the device, preferably inside the anode or anodes, or on the surface of the anode or anodes, housed inside the cooling pipes, arranged preferably in two rows, so as to generate magnetic deflection fields;

4) one or more reflective shields (9) acting as radiation shields known per se, consisting of a variable number (preferably 19) of thin reflective metal sheets, depending on the required insulation efficiency, for minimizing the energy dispersed by means of irradiation, arranged concentrically along the perimeter inner surface of the tube, electrically connected to the exterior and separated from each other by empty spaces via suitable spacers, except for a longitudinal strip referred to as "access window", for reflecting the radiation emitted by the cathode, back to the cathode, in order to reduce the radiation losses to the outside and to increase the efficiency at high temperatures;

5) optionally one or more grids known per se, arranged in any manner inside the vacuum tube, for generating electric fields for deflecting the electrons (10; 11; 13; 14; 15; 16);

6) one or more bases (21), on the glass wall, for performing the electrical connections between the inside and outside, known per se;

7) at the ends of the cathode (5) a suspension system which is formed by means of a conductor which may be made of the same material as the cathode, preferably wound in two spirals (7) joined together by a section along the outermost branch of the circumference of the spirals, so as to form substantially a pair of parallel discs made of conductive material for each side of the device, for lengthening the path of the electric output terminals, in order to reduce the dispersion of the cathode due to heat conduction, ensuring at the same time compensation of the heat expansion and keeping the position of the cathode unchanged;

8) on a receiving flange or on the body of the vacuum tube, the evacuation pipe (19) known per se.

The solar energy is concentrated on the cathode by means of optical systems so as to increase it to a temperature suitable for triggering the thermionic emission.

The cathode is connected to special support elements and elastic suspension means which keep it in position in the centre of a tube and are able to keep the relative position of the cathode and the at least one anode fixed.

The cathode is electrically connected by means of double-spiral conductors (7) so as to increase the length of the heat conduction path and limit the associated heat losses due to conduction via the electric terminals which connect it to the exterior. The conductors pass through the flanges and the person skilled in the art knows how to take into account the thermocouple and Peltier effects when effecting the electrical connections for series-connection of several devices and for the connections to the load.

The surface of the cathode may be advantageously treated in a known manner in order to increase the roughness thereof or provided with a conductive refractory lining in order to maximize the capture factor and minimize the reflection and emission factors, forming a selective surface, so as to increase the capture efficiency.

According to the embodiment shown in FIG. 2, two metal cooling pipes (18) are positioned alongside the cathode (5), said pipes having dimensions suitable for the thermal power to be extracted, being flattened longitudinally and welded to two thermal and electrical conduction fins which form the capture surfaces of the anodes (6), with a cross-section which is thinner towards the cathode, so as to form two flat surfaces which inclined at about 9° with respect to each other and positioned edgewise, coplanar with the cathode or in any case in a radial position with respect thereto, so as to have a minimum exposure cross-section and provide a view coefficient between cathode and anodes which is as low as possible in keeping with the cooling requirements; the view factor between cathode and anode for the configuration proposed in the example is 0.0018 for one side of the anodes which, added together for all the surfaces, gives a value of 0.007.

The capture surfaces of the anodes may be treated superficially with a lining which is designed to improve absorption of the electrons.

The pipes and anodes may be advantageously made of copper owing to the high electrical conductivity and high melting temperature characteristics and are mounted on pretensioned closing diaphragms in order to compensate for a heat expansion of about 2 mm at 100° C. for one meter of extension.

The pipes which form the anodes are insulated either using an electrically insulating cooling fluid or an internal pipe lining insulation and external insulating connections, so as to be able to use the pipe itself as a conductor and electrical output connection (18), or using separate flanges and passages for the pipes and for the electrical connections, so as to provide the electrical insulation, thus being able to use added water as cooling fluid.

These pipes are cooled with a circuit (not shown) for circulating cooling fluid at a temperature of about 70-80° C. which may be used for other purposes or may be cooled using passive means for keeping the anodes at a temperature of about 100° C.

The anodes are connected electrically to the exterior via the same cooling pipes which pass through the wall via suitable elastic flanges (17).

The following further components may also be present inside the tube:
one or more control grids (13), use of which is known in the art and which are arranged around the cathode;
one or more acceleration and deflection grids (14) which are arranged in four—preferably symmetrical—positions in the four quadrants;
one or more deflection grids (15) which are arranged in four—preferably symmetrical—positions in the four quadrants;
one or more grids (16) for shielding the field of the anodes, which are arranged in four—preferably symmetrical—positions in the four quadrants facing the anodes;
one or more containment grids (10) acting as reflective radiation shields;
one or more retaining and deflection grids (11) which are arranged in four—preferably symmetrical—positions in the four quadrants;
one or more deflection magnets (8) of any shape, which is/are positioned inside or outside the device, preferably housed inside the cooling pipes.

All the above functional elements (except for the magnets) are electrically connected to the exterior separately, by means of a corresponding number of pins of the connection bases, and are suitably positioned depending on the desired operating characteristics and are controlled, depending on the working characteristics and conditions, by suitable polarization circuits (not shown).

A pair of external mechanical suspension flanges (not shown) for stable positioning on the optical working point (optical focus) is also present.

The advantages provided by the present device include among others:
minimization of heat exchange due to radiation between cathode and anodes, favouring the heat exchange promoted by the electrons emitted from the cathode;
minimization of the heat exchange due to radiation of the cathode externally;
minimization of the heat exchange due to conduction;
in order to increase the thermal efficiency and therefore the overall efficiency.

These advantages are obtained using at least one of the following solutions or two of them or preferably all three of them:

i) The cathode and the anodes, at least one of these components, better two of them, even better all of them, are arranged laterally, substantially in the same plane, instead of superimposed and frontally facing as in the prior art, and substantially coplanar with each other, with the tangents to the respective surface facing such as to form angles ranging between 70° and 180°, but not exclusively so, preferably closer to 180°, so that at least one plane of symmetry of each component lies in the same plane of symmetry of at least a different one of these electrodes (if one is a cathode, the other is an anode) and in such a way that the view angle of each surface of the cathode and anode is as wide as possible, tending towards 180°, so as to obtain in this way a low heat exchange between cathode and anodes due to the low view coefficient between the respective surfaces. In the example, the two cathode and anode surfaces face each other at an angle of 165°, which corresponds to a view factor of about 0.0071 (5; 6). This angle, which must be as close as possible to 180°, depends on the size of the cooling pipes and the conduction cross-section of the cathode and is necessary in order to contain internally, in thermal contact with the anodes, the cooling pipes and allow housing of the deflection magnets. In the case of an essentially cylindrical cathode it is only the anode which is positioned edgewise in a radial position with respect to the cathode, causing a partial deterioration of the heat exchange conditions between cathode and anode.

ii) The cathode is electrically connected by means of double-spiral conductors (7) so as to increase the length of the heat conduction path and limit the associated heat losses due to conduction via the electric terminals which connect it to the exterior.

iii) The entire perimeter inner surface of the tube is lined with a reflective layer which is deposited on the wall and/or with only a thin reflective metal sheet or more than one reflective layer, preferably 7 layers (87.5%), even better with 9 layers, thus reaching 95% efficiency of the grids, acting as radiation shields, known per se, arranged concentrically, separated by empty spaces via suitable spacers, except for a longitudinal strip situated along and able to define the access window (4) through which the concentrated solar light beam enters at an opening angle which can be easily defined, preferably between 15° and 60°, even more preferably between 30° e 45°, an angle of between 30° and 40° being particularly preferred. The first internal layer of the radiation shields may consist of a cylindrical mirror (not shown) deposited on an electrically insulating substrate, or deposited directly on the inner wall of the vacuum tube, arranged in a manner known per se concentrically along the inner surface parallel to the axis of the vacuum tube, except for the longitudinal strip of the access window (4), so as to reflect the radiation emitted by the cathode, back onto the cathode, in order to reduce the losses due to radiation externally and increase the efficiency at high temperatures and electrically insulate the rear side so as to limit the possible thermionic emission of the first layer of the shield towards the successive shielding layers. This mirror may be advantageously formed, alternatively, by a metal cylinder which is mirror-polished or provided with a mirror effect by means of deposition of a reflective layer, with the external surface treated by means of application of an electrically insulating layer which may be formed as a layer of oxide of the same metal or by means of deposition of an insulating refractory layer or by means of superficial vitrification or other insulating treatment known per se, with the same form, the same functions and the same arrangement as that described above.

Being positioned inside the vacuum tube with a concentric arrangement, these shields will reflect the radiation irradiated by the cathode in the most efficient manner possible, back to the centre and onto the cathode. It is thus possible to obtain efficient heat insulation of the cathode for the screened part which may range from 77% to 84% of the total radiation or even greater.

Operation

By means of the direct light of the sun, the surface of which has a temperature of 5500° C., it is possible to obtain a peak thermodynamic cycle at temperatures of about 3000° C. which can be withstood by refractory materials such as tungsten (melts at 3387° C.) and graphite (sublimates at 3600° C.), allowing high efficiency levels to be achieved. The light is concentrated onto the cathode—having the form preferably of an elongated flat bar or a cylindrical form—of a high-vacuum tube by flat/parabolic mirrors (2) or other optical systems at a ratio with an order of magnitude of 1:100.

The cathode has the function of capturing the solar radiation and emitting electrons for thermionic emission. In order to maximize the capturing function, the surface is treated so as to make it porous and non-reflective and/or lined with a selective carbon lining known per se having a low emission and high absorption factor. The cathode is mounted at the centre of a system of reflective shields arranged internally along the wall of the tube, except for a segment which is left free for entry of the light (4), at a distance such as not to cause excessive overheating of the reflective layers and prevent deformation thereof. The tube may have a theoretical cross-section with a diameter, ranging—not exclusively—between 100 mm and 250 mm. At one or both the ends of the cathode longer paths are provided for the output terminals, made of the same material as the cathode, so as to reduce the heat losses due to transmission and lower the temperature of the output terminals in the zone passed through by the closing diaphragms. These paths are formed using a solid disc which is cut almost completely thickness-wise so as to provide two parallel discs which are joined along a section close to the edge and spirally machined by means of milling or some other per se known electrical, optical or chemical machining operation or by means of sintered pre-forming. This form allows expansion of the material, which for tungsten at 3000° C., corresponds to about 15 mm/m, compensating for the displacement. In the case of linear expansion of 15 mm/m it is sufficient to mount the cathode by pre-tensioning the elastic support elements so as to leave, in the example shown, a gap of about 10 mm on either side between the central zones of two spiral discs.

The energy emitted by the cathode via radiation is reflected and concentrated back onto the cathode so as to limit effectively the losses due to irradiation, which are considerable at these temperatures. In the case of a system of shields with 19 layers the efficiency of the shields is 95% and the part covered by the shields, which constitutes 89% of the surface, is applied to a segment of 320°, resulting in a shielding efficiency of 84% for the application.

The shields also have an electrical function: the vacuum tube forms an expansion chamber for the electrons emitted by the cathode and the negatively charged shields form the containing walls thereof so that the energy electrons emitted by the cathode are deflected and reflected by the electrical field and cannot strike them, causing them to overheat. The polarization of these shields, which behave electrically in the manner of a capacitor, may be left to the electrostatic charge which accumulates initially, due to the first impacts, controlling the maximum voltage thereof externally so as to keep it below the emission voltage of the electrons of the material which forms them at the equilibrium temperature of the said shields. For this purpose, the shields are electrically connected to a pin of the base of the electrical connections. Materials suitable for the first internal layer of the shields are nickel, iron, chromium or molybdenum for the high melting temperature and the high working function, allowing operation at a higher temperature and higher negative polarization voltage, before electron emission commences. Or, as a first reflective layer, a cylindrical mirror may be inserted, said mirror being made with a reflective layer deposited on glass or on some other refractory insulating substrate, except for a longitudinal strip called "access window", in order to improve the reflection of the first layer and prevent the thermionic emission thereof towards the successive outer-lying layers. The other shields may be formed with glossy aluminium sheets. A suitable polarization voltage could be in the region of −20V referred to the cathode, but the optimum value will be defined by means of measurement of the polarization curves of the component and may vary depending on the geometrical form and other characteristics of the device. The anodes (6) are composed of two metal profiles inside which the cooling pipe passes. They are arranged laterally parallel to the cathode (5), edgewise so as to have a view coefficient, with respect to the cathode, which is as low as possible. The view coefficient between these two components in the arrangement shown in FIG. 2 is 0.007 which corresponds to 0.7%. The cooling pipes of the anodes which also act as electrical connections pass out through the elastic diaphragms from the side walls and must be connected to the cooling system and to the electrical connection cables. The cooling pipes may house, inside them, a row of permanent magnets with aligned magnetic fields, oriented antiparallel and equidistant, so that the field lines in the spaces between them are arranged as far as possible horizontally and parallel to the surface of the anodes, except in the region of the poles. This allows deflection of the electrons orthogonally in relation to the flow lines, favouring the impact with the surface of the anodes or routing or capturing towards the poles.

A pair of control "grids" (13) with a slightly negative polarization compared to the cathode (for example −1 V) is arranged close to the surface of the cathode so as to select the electrons with energy greater than average and shield at the same time the cathode field which, emitting electrons, assumes a positive charge and would tend to slow down and attract back the electrons being emitted. (The voltages below will be indicated with respect to the potential of the cathode). The electrons, once they have passed beyond the first grid, will tend to spread within the space around the cathode, becoming less dense towards the walls of the tube owing to the negative electric field of the walls, forming a spatial charging zone. In order to compensate for the thus formed spatial charge, the second series of grids (14) is used, being polarized for this purpose by an external generator to a positive tension value. Since this grid and the following one are positively polarized, they capture electrons and therefore use energy. The voltage value of this grid and the series of following deflection grids is determined on the basis of the power percentage which is to be used and could reach a figure of about +10V, for the second grid (14), and +15V for the third grid (15). An acceptable compromise is to use 10% of the power output for this use. A further system of grids, the fourth one, is arranged around the anodes and is polarized to the voltage of the cathode acting as a shield for the negative charge of the anodes. It is assumed that it is possible to obtain an operating voltage of the device ranging between 1V and 5V, but the optimum voltage must be determined by means of an analysis of the operating curves in order to obtain the maximum conversion efficiency, using methods known to the person skilled in the art.

The last grid system is positioned as follows: two on the sides of the anodes and two aligned with the cathode; the first pair reflects the electrons which rebound on the anodes; the second pair deflects laterally the electrons which are emitted in alignment with the cathode. The latter pair is negatively polarized.

The object proposed is to provide a device which is able to produce about 1000 W per linear meter of extension using mirrors with an opening of 2.5 m (1; 2). With a working voltage of 1V currents of 1000 A per m must be managed, whereby the device must be divided up into several shorter elements owing to the need to increase excessively the conduction cross-section of the cathode and the output terminals. In this condition, with the proposed configuration shown in FIG. 1, in the case of a length of 1 meter, the emitted current density required is:

1000 A/706 cm^2=1.42 A/cm^2, in keeping with the saturation emission density of tungsten at 2500° C. which is 2.9 A/cm^2 and well in keeping with the possibility of raising the working voltage by increasing the temperature to 3000° C. corresponding to a saturation current of 72 A/cm^2.

Example of Evaluation of the Total Efficiency According to an Embodiment of the Device of the Invention, Considering the Various Losses and the Associated Efficiency Values The solar radiation, in order to be collected, first strikes the concentration mirrors with an efficiency of 90% and then the glass wall of the window which has an efficiency of about 92%, resulting in a combined efficiency factor hitherto of 0.83;

the capture losses on the cathode may be estimated at about 5%, with a capture efficiency therefore of 95% and a combined efficiency factor of 0.79. The theoretical thermodynamic efficiency of the equivalent Carnot cycle at these temperatures (3000° C. cathode, 100° C. anode) reaches a figure of 88.6%, giving a combined efficiency factor of 0.70. From this the following are then subtracted: the losses due to radiation between cathode and anodes (which can be estimated at 2.8%), the losses due to radiation through the inlet window (which can be estimated at 7% for the configuration proposed), the losses due to radiation through the radiation shields (which can be estimated at 5%), giving a total radiation loss of 14.8%, and an insulation efficiency of 85%, resulting in a combined efficiency factor of 0.59. In addition it is required to consider the losses due to heat conduction on the electric terminals of the cathode (which can be estimated at 3%) with a combined efficiency factor totalling hitherto 0.58; the conversion losses due to spatial charging and to polarization of the grids (which can be estimated at 10%) with a combined efficiency factor of 0.52, the electrical losses due to the Joule effect along the electrical connections (which can be estimated at 15%), giving ultimately a total estimated electrical efficiency of 44% for the system. Estimating a heat recovery of about 5% via the pipes for cooling the heat discarded from the Carnot cycle, 5% for the losses due to heat conduction and 5% for the electrical losses (losses due to the Joule effect on the anodes), it is possible to calculate a cogeneration recovery value of about 15% by way of thermal energy which, added to the electrical efficiency, results in a total efficiency of the working plant which may be estimated at a figure close to 59%.

To summarize: 90% efficiency of the mirrors; 49% electrical efficiency of the converter; 15% heat recovery; giving a total estimated efficiency of the plant equal to 59%.

All the dimensions may be determined by the person skilled in the art, who is able to realize the invention with reference to the text and the illustrations shown in the figures.

The invention claimed is:

1. A thermionic solar converter with a linear arrangement of components, suitable for the direct conversion of solar energy into electrical energy and the combined generation of heat and energy, in the form of an elongated transparent vacuum tube comprising:
    a cathode and at least one anode, said cathode and at least one anode being arranged longitudinally alongside each other along the tube;
    grid electrodes for generating electric fields;
    means for directly cooling the at least one anode;
    means for electrically connecting the electrodes from the inside to the outside; and
    an optical access window along a surface area of the tube; wherein:
    the cathode has an elongated form; is made of conductive refractory material; is suspended centrally inside the tube; and forms an element for capturing solar energy, for performing a thermionic conversion, by a direct focus of sunlight thereon without any intermediate heat transfer means;
    the electrical connection means form an extended path provided to the cathode and having a form which is able to compensate for heat expansion;
    the cathode and the at least one anode have a relative arrangement with a view factor, from the cathode to the at least one anode, of between 0.001 and 0.5;
    said converter further comprises a radiation shield which is positioned along an inner surface of the tube, and
    the at least one anode comprises two anodes, and the cathode is arranged centrally with the two anodes mounted along sides of the cathode in minimum radiation positions.

2. The thermionic solar converter according to claim 1, further comprising one or more deflection magnets for generating a magnetic field, arranged inside or outside the tube.

3. The thermionic solar converter according to claim 1, wherein at least one of the two anodes is in the form of a longitudinally flattened pipe through which a cooling fluid may flow.

4. The thermionic solar converter according to claim 2, wherein the one or more magnets are housed inside at least one of the two anodes.

5. The thermionic solar converter according claim 1, further comprising mechanical locking means at the two ends of the tube for exact alignment of converter elements and for positioning the converter with respect to an optical energy concentration system situated outside the converter.

6. The thermionic solar converter according to claim 1, wherein the radiation shield is formed using a system chosen from among:
    metal sheets with mirror surfaces, arranged along the inner surface of the tube;
    reflective linings obtained by means of deposition on the inner surface of the tube;
    one or more mirror-polished metal cylinders;
    one or more glass cylinders with a reflective layer deposited on their inner surface; and
    combinations thereof.

7. The thermionic solar converter according claim 1, wherein the radiation shield has a rectangular access window in the form of an interruption in the shield corresponding with the optical access window, and depending on an opening angle of a concentration system, so as to allow the entry of light.

8. The thermionic solar converter according to claim 1, wherein
the means for electrically connecting the cathode to the exterior is arranged inside the tube in a form to compensate for heat expansion, and
the form of the means for electrically connecting is chosen from among: straight, folded, curved, interwoven, wound, and combinations thereof.

9. The thermionic solar converter according to claim 1, wherein the cathode and at least one of the two anodes have, independently of each other:
a cross-section chosen from: cylindrical, polygonal, lenticular, trapezoidal, droplet, oval, and elliptical, and
a longitudinally flattened and finned form.

10. The thermionic solar converter according to claim 1, wherein the cathode is suspended from at least one end of the tube by a conductor wound in the form of a double spiral to form a pair of discs parallel to each other at at least one end.

11. The thermionic solar converter according to claim 1, wherein one or more deflection magnets are positioned inside a cooling pipe of at least one of the two anodes.

12. The thermionic solar converter according to claim 1, wherein the optical access window formed in the tube has an elongated rectangular shape and forms an optical element forming an integral part of the system for focusing solar energy on the cathode.

13. The thermionic solar converter according to claim 1, wherein the converter is configured for use in combination with an optical system for concentrating solar energy inside or outside the tube.

14. An optical system for concentrating energy, comprising at least one converter according to claim 1.

15. The optical system for concentrating energy according to claim 14, further comprising a concentration system suitable for concentrating solar energy on the cathode.

16. The optical system for concentrating energy according to claim 14, comprising a plurality of converters.

17. The optical system for concentrating energy according to claim 14, wherein the optical system is configured for communicating with a heat recovery system for use at low temperatures.

18. The optical system for concentrating energy according to claim 15, wherein the concentration system comprises: cylindrical/parabolic mirrors, multiple or prismatic mirrors, single or multiple lenses, Fresnel or prismatic lenses, or a combination thereof.

19. The optical system for concentrating energy according to claim 16, wherein the plurality of converters are arranged in units aligned and connected together by hydraulic and electrical connections.

20. The thermionic solar converter according to claim 1, wherein
the cathode and at least one of the two anodes have a relative arrangement with a view factor, from the cathode to at least one of the two anodes, of between 0.001 and 0.3.

21. The thermionic solar converter according to claim 20, wherein
the cathode and at least one of the two anodes have a relative arrangement with a view factor, from the cathode to at least one of the two anodes, of between 0.001 and 0.1.

22. The thermionic solar converter according to claim 21, wherein
the cathode and at least one of the two anodes have a relative arrangement with a view factor, from the cathode to at least one of the two anodes, of between 0.001 and 0.05.

23. The thermionic solar converter according to claim 22, wherein
the cathode and at least one of the two anodes have a relative arrangement with a view factor, from the cathode to at least one of the two anodes, of between 0.001 and 0.03.

* * * * *